Figure 1:
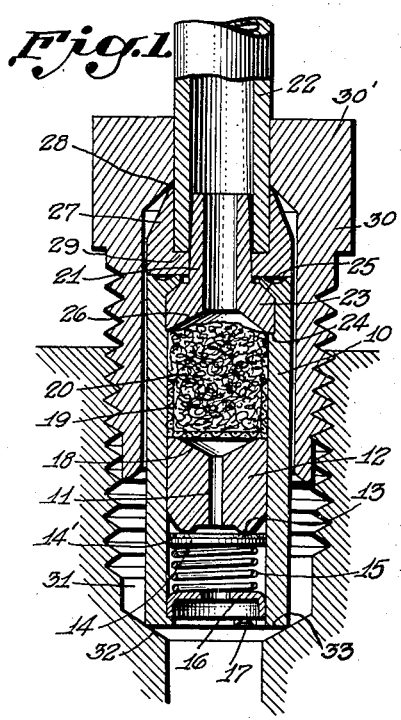

Dec. 13, 1938.   J. BIJUR   2,139,659
CENTRAL LUBRICATION
Filed April 24, 1934   2 Sheets-Sheet 1

Inventor:
George Bijur, Executor
by Joseph Bijur, Deceased

By
Dean, Fairbank, Hirsch & Foote
Attorneys

Dec. 13, 1938.     J. BIJUR     2,139,659
CENTRAL LUBRICATION
Filed April 24, 1934     2 Sheets-Sheet 2
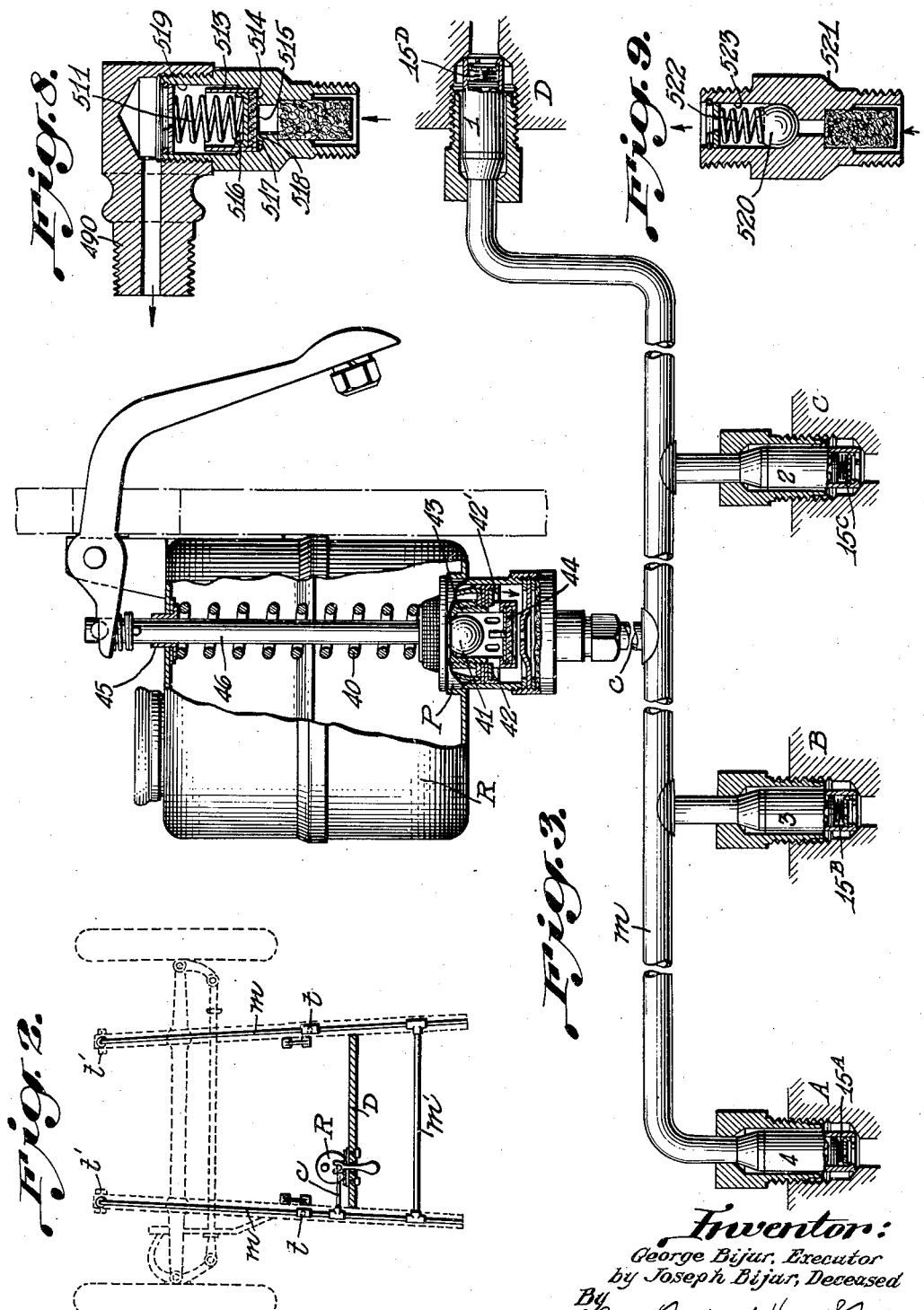

Patented Dec. 13, 1938

2,139,659

UNITED STATES PATENT OFFICE 2,139,659

CENTRAL LUBRICATION

Joseph Bijur, deceased, late of New York, N. Y., by George Bijur, executor, New York, N. Y., assignor to Auto Research Corporation, a corporation of Delaware Application April 24, 1934, Serial No. 722,100

20 Claims. (Cl. 184—7)

The present invention is concerned with central lubricating systems of the general type, in which the outlet branches of a distributing piping system have metering outlets or pressure-responsive flow controlling fittings, which preferably normally maintain the entire piping system completely or largely filled with lubricant during the intervals between operation of the machine and/or between pump pressure operations exerted at the inlet of the system.

The system of the present application may function to predetermine the relative rates of discharge at the various drip plugs so that all of them will emit for the same period of time, and/or it may predetermine the relative time or period of discharge during any one operation of the system.

According to one embodiment of the present invention, the valves in the metering fittings are maintained closed by graded pressures and the pump or other source of lubricant pressure at the inlet of the line exerts a systematically varying pressure during each discharge operation so as to maintain each valve open during an interval varying in approximately an inverse ratio with the strength of the corresponding spring.

In a preferred embodiment, the metering fittings have valves seated by coil springs of different pressures, and a manually or automatically, intermittently or continuously actuated pressure pump is employed. This pump may be provided with a discharging spring exerting an initial discharge pressure overcoming all of the valve springs, but which drops off rapidly as the stroke proceeds, to a minimum exceeding only that of the weakest of the valve springs or it may act in a reverse direction.

In another embodiment the restrictions at each metering fitting are varied to give the desired apportionment, although in the first embodiment the flow controlling restriction of the various metering fittings used may be identical, where a greater range of rates or discharge is desired, metering fittings such as those shown in the copending application, Serial No. 580,668, filed August 9, 1922, now Patent No. 1,975,920, may be employed with different instantaneous rates of discharge, in association with valve springs of various strengths, the strongest valve spring being in general associated with the metering fitting of slowest rating or of highest restriction.

While the system disclosed may operate with metering fittings or drip plugs of various constructions, I have disclosed and claimed certain metering fittings or drip plugs distinguished by cheapness of construction and compactness.

Figure 1A:
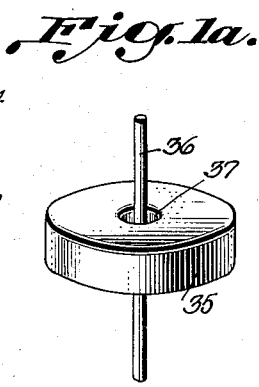

In the accompanying drawings in which are shown one or more of various possible embodiments of the several features of the invention, Fig. 1 is a longitudinal cross-section, showing one form of a metering fitting or drip plug in assembled condition, Fig. 1a is a perspective view illustrating the method of making the restriction element of the metering fitting or drip plug of Fig. 1, Fig. 2 is a fragmentary diagrammatic view indicating the application of the installation for chassis lubrication, Fig. 3 is a diagrammatic view partly in section indicating a complete installation, Figs. 4, 5, 6, 7, 8 and 9 are views similar to Fig. 1, respectively showing further alternative metering fittings or drip plug constructions.

In Fig. 1, is shown a metering fitting which includes a cartridge unit comprising a cartridge shell 10, having therein a minute flow controlling restriction, shown as a minute axial passageway 11 of accurately predetermined diameter, in a separate metal plug 12, friction-fitting into the cartridge.

The plug which is of soft metal, such as lead-tin-antimony alloy, is preferably molded in a punch-pressing operation, so as to afford as an integral part thereof, the annular valve seat 13 cooperating with a valve 14. This valve 14 may comprise a disk with appropriate facing 14' of oil-silk which is urged against the preformed valve seat 13 by coil spring 15, reacting against a cup 16 held in place within the extremity of the cartridge by staking, as at 17. The opposite end of the plug 12 is countersunk, as at 18, to afford a stop at its rim only for the fine wire mesh backing 19 of the felt strainer plug 20, seated in the inlet end of the cartridge.

An insert sleeve 21, preferably of steel, for the end of the supply pipe 22, ordinarily of copper or brass, constitutes a unitary part of the cartridge. For this purpose, the sleeve has an enlarged head 23 resting against a shoulder 24 within the cartridge, the outer part of which cartridge is swaged at 25 inward about the enlarged head 23. The inner end of the insert sleeve head 23 is countersunk, as at 26, so as to clear the inlet end of the felt strainer, thereby to avoid compressing or reducing the effective area of the latter exposed to flow.

A compression coupling sleeve 27 having a beveled outer edge 28 extends about the insert sleeve 21 and affords a bottoming rest at its inner flange 29, for the extremity of the lubricant supply pipe 22.

The metering fitting or drip plug is secured in position and a lubricant-tight connection thereto is effected by means of a bushing 30 threaded into a corresponding socket 31 in the supporting or bearing structure for the drip plug terminal, said bushing having a head 30' reacting against the extremity 28 of the compression coupling sleeve and forcing the latter inward upon the pipe end 22. The hard metal insert sleeve prevents compression of the pipe under the clamping force exerted thereon by the threaded bushing.

The inner end of the socket 31 is beveled, as at 32, so that only the outer edge 33 of the cartridge is pressed thereagainst, and this on a diameter considerably larger than that at which the threaded bushing 30 contacts the edge 28 of the compression sleeve. Accordingly, in tightening the threaded bushing, the inner end of the cartridge will be retained against rotation with greater force than that tending to rotate the compression sleeve, whereby there is no twisting tendency upon the pipe 22 in the process of tightening the compression joint.

The restriction plug 12 is preferably formed from an apertured slug 35 of lead alloy, shown at Fig. 1a, which is shaped to the form shown at 12, in the drawings by a stamping or a die operation, exerted by a punch press (not shown). The diameter of the hole or bore 11 is determined by inserting a hard metal wire 36 through the hole 37 of the slug 35, so that the metal of the soft slug will flow inward as it is compressed to tightly engage the wire which is then simply withdrawn, leaving the miniature passageway or bore 11 of precisely the diameter of the wire.

By the operation described, there is provided at little cost, a bore of accurately predetermined diameter, which could be accomplished with difficulty, if at all, by a drilling operation. The lead plug is of thickness such that the bore will suffer no appreciable diminution of diameter when the plug is forced into the cartridge. The metering units described are of general application to central lubricating system operating regardless of the type of pump or pressure source employed, although a pressure source, the pressure of which varies systematically, may be very satisfactorily employed.

The drip plugs of different ratings would be produced by providing the bores 11 of different accurately predetermined diameters, employing corresponding wires 36 of different diameters in the process of making these plugs according to the method previously described. The restriction plug in a preferred embodiment may have a bore 11 of $\frac{3}{16}$ inch in length and of diameter, depending on the relative rating of ten one-thousandths to twenty-one thousandths (.010 to .021) inch in diameter.

All of the metering fittings or drip plugs, regardless of rating being identical, except for the minute concealed bore 11 therein, the plugs are readily identified according to rating by a rating mark.

The metering fitting or drip plug described is of short length, so that most of the length thereof may be disposed within the relatively shallow socket 31 in the mounting structure. The installed drip plug is completely concealed and protected. Only the threaded terminal bushing 30 is exposed, substantially as in the case of an ordinary pipe terminal devoid of a flow controlling instrumentality.

For a clearer understanding of the system, there is shown diagrammatically in Fig. 2, an automobile chassis lubricating installation embodying the drip plugs described. The lubricant supply unit is shown on the dashboard D and comprises an oil reservoir R with an associated pressure pump P, to the outlet of which is connected pipe c, which leads to one of the two mains m extending the length of the channel frames and in communication with each other through a cross pipe m'. Branches or taps t, a few only of which are indicated, lead from the mains to the various chassis bearings to be lubricated, such as the spring shackles and bolts, steering gear and other gearings. The outlet of each branch and the ends of the mains are provided with the drip plug terminals, which are applied each directly to the non-turning element of the bearing to be supplied therefrom. Pipes or conduits of suitable flexibility (not shown) may be employed to bridge from the mains, or from one of the mains, to mains on one or both of the axles and/or other parts that perform relatively large movements with respect to the frame in use of the vehicle, such as for instance, the steering knuckles and the brake rigging.

The outlet terminals t' are each preferably drip plugs of the construction shown in Fig. 1 and above described applied some at branches brazed onto the line, as best shown in Fig. 3, and others at the extremities of the line. The entire length of piping from the pump to each of the drip plugs is preferably of rigid small diameter piping which is substantially non-dilatable under the operating pressures employed, and may be of uniform bore throughout.

In the system of Fig. 2 embodying the devices of the construction set forth and shown in Fig. 1, the resistance to flow of each drip plug is such as in itself to be substantially controlling of the rate of emission, therethrough under operating pressure, almost regardless of the resistance imposed by the entire length of pipe line and by the bearing. In each drip plug as heretofore suggested, the restriction bore, even that of the coarsest or fastest flowing drip plug is the preponderating and controlling element determining the rate of flow, its resistance being considerably greater than the combined resistance to flow of the relief valve and of the strainer plug thereof.

In Fig. 3 the drip plugs, a few of which are shown at A, B, C and D, are each provided with a relief valve 14' similar to that shown in Fig. 1. The springs 15A, 15B, 15C and 15D respectively, seating said valves, are, however, not of substantially uniform strengths as in the copending application, but are of graded strengths. Thus, the springs may have seating pressures, such that the weakest spring 15A, opens, say at a pressure of approximately twelve pounds per square inch, the next weakest 15B at twenty-four pounds per square inch, and upward at intervals, say of twelve pounds per square inch, the spring 15D having maximum strength of forty-eight pounds per square inch.

For this system, a source of pressure or pump is required, which exerts a systematically varying rather than a constant discharge pressure. The pressure may increase from a minimum to maximum, decrease from a maximum to a minimum, or it may move between maxima through a minimum or between minima through a maximum.

The pressure in one embodiment is so applied as to overcome the weakest of the valve springs throughout its duration, the strongest of the valve springs being maintained open for a minimum duration and the springs of intermediate strengths for intermediate durations.

The reservoir R is shown provided with a short pump cylinder P affixed in the bottom thereof and protruding therebelow. The piston 42 in the cylinder has suction cups 42' and has an opening for a valve cake 43 with a check valve 41 therein, said cage affording openings through which lubricant flows from the reservoir into the pump cylinder, which latter is normally closed by the end 44 of the piston structure. The assembly, if desired, may have a coil spring giving a relatively constant discharge pressure, but in the preferred construction the spring 40 is arranged to provide a greater range of pressure variation from fully stressed to expanded state. To this end, the spring has relatively few turns and they are spaced relatively far apart.

The upper end of spring 40 reacts against a bushing 45 through which the upper end of the piston rod 46 extends. The spring 40 is under but little stress in its most expanded state shown, to exert a piston seating pressure of but say eighteen pounds per square inch just strong enough to overcome the weakest of the relief valve springs 15A, so that the pump piston will effectively discharge to the very end of its stroke. The maximum strength of the spring 40 in fully charged position is sufficient to overcome the strongest of the valve springs, that is, to exert an initial discharge pressure when the pump operating member is first released, of say eighty pounds per square inch.

Figure 4:
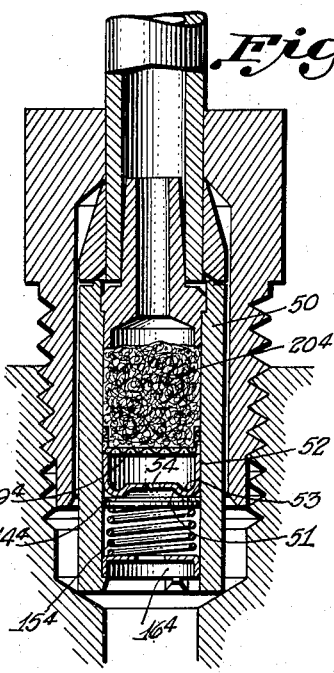

There is illustratively shown in Fig. 4 a desirable form of metering fitting or drip plug for use with the system of Fig. 3. This drip plug includes a cartridge 50 similar to that of Fig. 1, but shorter. Within the cartridge, there is press-fitted a sheet metal member 51, formed as a cup with an upstanding wall 52, and embossed outwardly at 53 to provide a valve seat. The cup 51 has an extremely minute flow resisting aperture 54 therein, all of the drip plugs regardless of rating having the same size aperture. Against the valve seat 53 is pressed a disk valve 14⁴ identical with that of Fig. 1, urged against its seat by a coil spring 15⁴, which reacts against a press-fitted retaining cup 16⁴. The strainer plug 20⁴ is lodged within its fine wire mesh holding cup 19⁴, the latter of which bottoms against the upstanding wall 52 of the cup 51.

As in Fig. 2, the drip plugs are rated in accordance with the relative charges to be emitted therethrough. The rating is determined here solely by the strength of the relief valve spring 15⁴, the other parts of the drip plug including the restriction apertures 54 regardless of rating, being identical.

In operation, the stressed spring through the medium of the pump plunger immediately exerts a pressure which is transmitted throughout the lubricant-filled pipe system and is of magnitude such as to exert at each of the drip plug valves a pressure sufficient to overcome the corresponding spring. Emission, accordingly, takes place through all of the drip plugs at substantially uniform rate, the resistance imposed by the various bores being in itself substantially controlling of the rate of discharge substantially regardless of the length of intervening pipe line and the resistance of the bearing.

As the pump stroke progresses, the strength of the discharge spring progressively diminishes until presently it is insufficient to overcome the resistance of the strongest valve seating spring or springs 15D on the line. The valves controlled by said springs, accordingly, close at that stage in the pump stroke while the emission continues through the remaining still open drip plugs.

At successive stages of the progress of the pump discharge, the valves will close in the inverse order of the strengths of their springs, until finally near the end of the pump discharge stroke, the pressure due to the pump spring is sufficient to effect emission only through those drip plugs 15A, the valve seating springs of which are of minimum strength. At the end of the pump stroke the end of the piston seats and closes the outlet to prevent further emission and the weakest of the valve springs 15A also will close. The pipe line will, therefore, remain charged with oil during the intervals between successive pump operations, all of the drip plug valves being closed.

This, it will be seen that in pump discharge, those valves having the weakest springs remain open throughout the discharge, while those having the strongest of the springs remain open for the smallest portion of the discharge, the springs of various orders of intermediate strength remaining open for the corresponding intermediate periods.

In one preferred embodiment, the drip plugs are preferably all of identical construction except for the strength of the valve seating springs. Preferably the drip plugs are each provided with a rating mark, I, indicating the drip plugs giving the smallest discharge, the rating 2 designates those plugs having the next higher rate of discharge and corresponding to the spring of next greater strength, etc.

Thus, in operation throughout pump discharge, all of the drip plugs emit at substantially the same rate determined by the minute restriction 54, but the durations of emission vary substantially inversely with the strength of the valve seating springs. The relative discharges through the drip plugs during one complete operation of the pump are governed by the time or period that the various valves are kept open, rather than by the absolute or relative instantaneous rates of emission.

Figure 5:
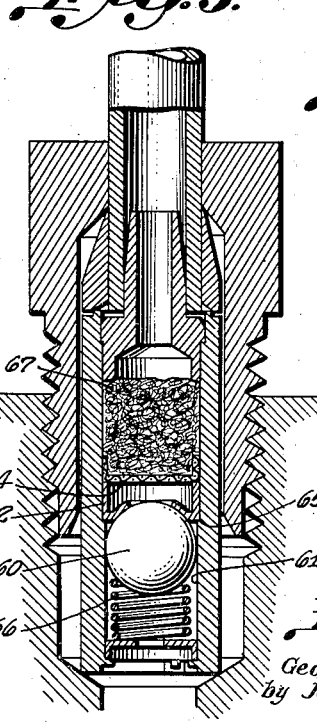

In Fig. 5 is shown a construction of drip plug alternative to that shown in Fig. 4. According to this embodiment, the special flow retarding bore is eliminated, the valve accomplishing the restricting function by providing but a minute clearance therefor in the cartridge. Specifically, there is shown a preferred metal ball valve 60 fitting with but a minute clearance in the order of one thousandth (.001) inch in the cartridge bore 61. The valve seat is provided by the preformed face of a sheet metal cup 62, which may be friction-fitted in the cartridge, and preferably also bottom against a shoulder 65 provided in the cartridge. The strainer plug 67 with its wire-mesh backing cup 64 rests against the rim of valve seat 62. The drip plugs are preferably identical regardless of their rating, which is determined by the strength of the spring 66 that urges the valve 60 to its seat.

While it is preferred to employ a spring discharged pump such as described, in executing the present system of operation, other propulsive means, manually actuated or automatic, may be employed for exerting the varying propulsive impulse required in this system of operation.

While it is preferred initially to apply the maximum pressure and to allow the same to diminish as the pump discharge proceeds, it is understood that it is within the scope of the invention to cause the pressure to rise from a minimum and to effect a maximum pressure near the end of the pump discharge.

It will be understood that the drip plug shown in Fig. 1 or in any of those embraced within the scope of the copending application, Serial No. 580,668, filed August 9, 1922, may be employed in the system shown in Fig. 3. For this purpose, the restriction apertures or plugs may all be of uniform bore or flow resisting effect, the variation being solely in the valve seating springs as heretofore pointed out and/or the restriction apertures may vary.

Where a greater range of rates or quantities of flow through the various fittings is desired, on a single system of the general character set forth, that is, where the fastest of the drip plugs is to feed more than six or seven times as fast as the slowest, drip plugs such as that disclosed in Fig. 1, or in the copending application above referred to are employed with their restriction bores 11 rated according to flow which are equipped, however, with the time controlling valve springs previously described.

Thus, there might be employed with each of say five or six different ratings of flow restrictions, different strengths of valve springs, the strongest springs being associated with the slowest drip plugs, and the weakest spring with the fastest.

By thus superposing the control by both instantaneous rate and duration, a wider range of relative charge emitted is attained, and these are controlled to a degree of accuracy, which could be accomplished were the regulation of but one of these determining factors availed of, only by a precision of workmanship not readily attainable in ordinary manufacturing practice. Each of the drip plugs may bear its appropriate rating mark, so that the drip plug desired for any particular rating can be readily selected and installed without the need for any adjusting operation whatsoever.

Figure 6:
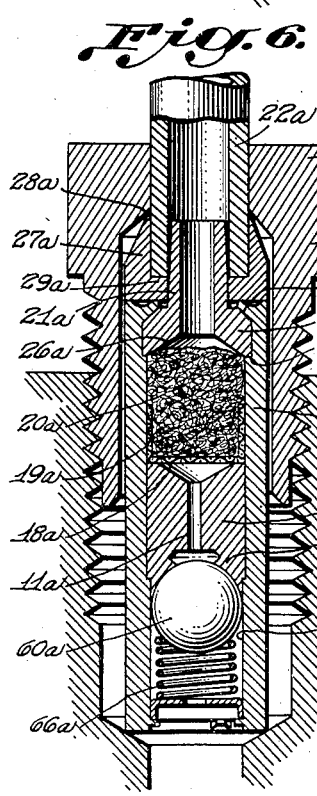

In Fig. 6 is shown another drip plug construction embodying the fixed restriction of Fig. 1 and the valve restriction of Fig. 5, similarly functioning parts being designed by the same numerals followed by the letter *a*.

By this construction the restriction of the plug 12a and of the ball 60a, as well as the strength of the spring 66a may all be varied to regulate the rating of the fitting.

It is, of course, understood that the system and the fittings herein claimed, though well suited for chassis lubrication, have a far wider field of application to machinery and other bearing installations.

Figure 7:
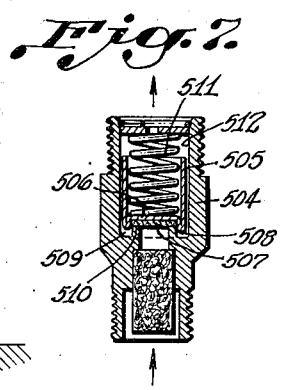

In Fig. 7 is shown another form of seepage or drip plug fitting in which the seepage resistance is a part of the valve structure. The support fitting element corresponding to 490 in Fig. 8 is not shown here and would ordinarily be supplied in use, for attachment to a bearing structure, but may be omitted, in which case, the cartridge 504 is directly threaded into the bearing or bolt.

In this embodiment, the valve includes a cylindrical metallic tube 505 having an integral countersunk closed end 506 against the outer face of which fits the flexible seating portion 507, the rim 508 of the end 506 extending, when the valve is seated, into a trough 509 in the fitting about the valve seat 510. The valve closing spring 511, as shown, extends into the tube against the end 506.

Preferably the outer diameter of the tube 505 is in the neighborhood of but .001 inch smaller than the bore 512 of the fitting, so that, in operation, the pressure in the lubricant is absorbed in passing through the small cylindrical crevice between the tube and the bore. In this embodiment, it will be seen that the lubricant forced between the fitting bore 512 and the valve tube 505 therein through the intermediate seepage crevice, tends by frictional resistance to draw said valve along in the direction of flow, and thus aids to overcome the resistance of the valve seating spring 511, as distinguished from other constructions, shown in application Serial No. 580,668, filed August 9, 1922, in which the frictional resistance of the restriction to flow, has no effect in maintaining the valve from its seat.

In the embodiment of Fig. 7, therefore, a stronger valve seating spring may be used for a given pump pressure, since the lubricant pressure absorbed in the seepage resistance in this case, becomes effective in raising and maintaining the valve raised from its seat while pressure is applied.

The valve 507 will, therefore, be raised under pressure for a substantial distance from its seat, so that the resistance to flow in the fitting is substantially entirely in the minute crevice between the fitting bore and the relief valve tube therein.

Fig. 8 is an embodiment structurally generally similar to Fig. 7. In this embodiment, the lower end of the cylindrical tube 513 is swaged, as at 514, over the periphery of the lower surface of the valve seating portion 515 and the latter is maintained tightly jammed in place within the tube 513 by a flanged friction plate 516 therein.

In the embodiment shown in Fig. 8, the length of the fitting bore 517 adjacent the valve seat 518 is about .001 inch larger in diameter than tube 513 affording a corresponding minute annular crevice about the valve. At a distance of a small fraction of an inch from said valve seat, the fitting bore is widened somewhat as shown at 519 to afford a diameter preferably about .002 inch larger than that of the valve tube 513, for a purpose which will appear in the operation now to be set forth.

In operation, with the usual grade of oil, when the weather is not cold, the application of the pump discharge pressure will effect opening of the valve 515 to an extent sufficient to permit the slow flow of oil through the high resistance seepage crevice near the seat 518 of the fitting. The operation proceeds substantially as in the embodiment of Fig. 7.

In cold weather, when the oil becomes so viscous that it cannot flow through the minute crevice near the seating end of the fitting, the pressure transmitted through the lubricant becomes effective to bodily move the valve 515 from its seat into the enlarged bore portion 519 of the fitting.

The effective crevice being thus materially enlarged in cross-sectional area, the viscous oil can flow therethrough on its way to the bearings. It is particularly to be noted that the enlargement of the bore is merely sufficient to permit slow flow of the more viscous oil without pressure relief. Thus, the seepage fitting described, responds automatically to high pressure delivered through highly viscous oil to decrease the resistance to flow sufficiently to permit flow of the viscous lubricant without relief of pressure and after completion of the discharge, the spring 511 returns the valve to its seat 518.

In Fig. 9 is shown another embodiment of seepage fitting like that of Figs. 5 and 6 embodying a cartridge fitting element generally similar to that shown in Figs. 7 and 8, except that instead of a disk or cylinder valve, a spherical or ball valve 520 performing the combined function of valve and seepage resistance is employed.

The ball 520 is urged against its seat by a spring 522 and is located in a cylindrical bore 523 in the fitting of diameter so little larger than that of the ball that upon the application of pressure to the lubricant and unseating of valve, the crevice for oil flow between the bore and the ball is so minute that the pressure is not relieved and the oil is forced past the ball in the desired slow drop by drop movement.

It will be noted, more particularly in the embodiment of Figs. 5, 6 and 7, that the closure valve and the restricting element fitting the cartridge bore to form the seepage resistance are either one and the same element or are connected to form a unitary structure.

As as operational consequence, the lubricant in passing through the minute restriction, as already suggested in the description of Fig. 7 above, tends to draw or drag the restricting member along with it, thereby aiding in maintaining the connected valve open against the resistance of the spring, which tends to reseat it.

Since in this embodiment the seepage resistance in operation, assists in maintaining the valve open, it is feasible with a given pump discharge pressure, to use a stronger valve seating spring than in embodiments in which the seepage resistance does not coact in operation to hold the valve from its seat.

It is, of course, understood that any of the various seepage constructions described may be used on any lubricating line or the installation may be equipped at various parts with seepage fittings of different design. It will also be understood that the various distinctive parts of various seepage fittings may in many cases be interchangeably used in other forms of fittings.

The present application is a continuation in part of application Serial No. 155,644, filed December 18, 1926, and of application Serial No. 580,668, filed August 9, 1922, Figs. 1 to 5 corresponding to Figs. 1 to 5 of Serial No. 155,644 now Patent Number 1,955,732, and Figs. 7 to 9 corresponding to Figs. 43 to 45 of Serial No. 580,668, now Patent No. 1,975,920.

What is claimed is:

1. In a lubricating installation, in combination, a valve casing having a valve seat, a valve spring-pressed against said seat, said valve being constructed and arranged relative to the casing thereof to afford upon application of pressure to overcome the seating pressure, a minute high resistance crevice for flow of the lubricant past the valve to and through the seat.

2. As an element in a lubricating installation, a pipe fitting having a valve seat therein and a spherical valve, a spring pressing said valve against its seat, said fitting having a bore adjacent said valve seat of diameter very slightly larger than that of said valve, whereby upon unseating of said valve by the application of pressure overcoming the opposition of said spring, high resistance is interposed to forcing of oil between the bore and the valve.

3. A metering unit comprising an elongated casing having a valve seat between the ends thereof, a check valve in the outlet end of said casing and a spring urging said valve against said seat, said metering unit being adapted to be used in a centralized lubricating installation to predominantly control the feed from the piping system of such installation to a bearing to be lubricated, the spring of the valve determining the pressure at which the valve will unseat to permit flow of oil to pass into said bearing, and said valve being constructed and arranged relative to the casing thereof so that upon the application of pressure to overcome the seating pressure of the spring, a minute high resistance crevice will be formed between the valve and the casing for the flow of lubricant past the valve and through the seat, said crevice having a much higher resistance than the resistance of the piping system and the bearings.

4. A metering unit comprising an elongated casing having a valve seating member between the ends thereof, a strainer plug in the inlet end of said casing bottoming against said valve seat member, a check valve in the outlet end of said casing and a spring urging said valve against said seat, said valve seat having a minute passage therethrough of accurately predetermined flow resistance substantially determining the resistance to flow imposed by the complete fitting.

5. A metering unit comprising an elongated casing having a valve seat member firmly fitted thereinto and provided with a minute flow resistant aperture therethrough, a disk valve in the end of said cartridge adjacent said seat, a spring urging said disk valve against said seat, and a strainer plug having a metal screen backing in the other end of said cartridge and lodged against the valve seat member.

6. A flow controlling metering fitting comprising an elongated casing, flow resisting means in said casing comprising a soft metal plug friction fitted thereinto and provided with a highly restricted passage therethrough, and a dense strainer in said casing in advance of said plug serving to intercept any solid impurities from the course of oil flow to said bore.

7. A flow controlling metering fitting, comprising an elongated casing, flow resisting means in said casing comprising a soft metal plug friction-fitted thereinto and provided with a highly restricted passage therethrough.

8. A flow controlling metering fitting comprising an elongated casing, flow resisting means in said casing comprising a soft metal plug friction fitted thereinto and provided with a highly restricted longitudinal passage therethrough and a spring seated check valve in said casing at the outlet side of said bore to prevent leak of lubricant therethrough.

9. A metering construction comprising an elongated casing having a thick metal plug friction fitted therein and provided with a longitudinal minute passage of accurately predetermined diameter, said plug being formed as an annular valve seat at its outlet end, a check valve within the end of said casing and a spring normally urging said valve against the seat on said plug.

10. A metering unit including an elongated casing having a pressed-metal plug friction-fitted therein, said plug provided with an axial passageway of minute accurately predetermined diameter, said plug being countersunk at its inner end and a strainer plug in said cartridge having a metal screen backing lodged against the rim of said countersunk portion.

11. A metering unit including a cylindrical cartridge, a pressed metal plug friction-fitted thereinto and including an axial passageway of minute accurately predetermined diameter, said plug being formed with an annular valve seat at its outlet end, a disk check valve in the outlet end of said casing and a coil spring urging said valve against said seat, the inlet end of said plug being countersunk and a felt strainer plug in the inlet end of said casing and provided with a fine mesh metal screen backing, said backing resting against the rim of the countersunk portion of said restriction plug.

12. A metering valve for use in a centralized lubricating installation to control the flow of lubricant from the tubing system of such an installation to a bearing to be lubricated, said valve having a recess receiving a reciprocating valve member and a seating spring for said valve member, one end of said recess being formed as a seat against which said spring normally presses said valve to close said outlet, said valve when forced from said seat by lubricant pressure from said pump forming a minute annular crevice serving as the sole high restriction passage, in respect to said recess, said passage having a tremendously higher resistance than the resistance of the piping system and the bearing, the end of said recess being closed by a cup member to receive the other end of said spring that presses against said valve, the rating of said metering valve being determined by the strength of said spring.

13. A metering valve for use in a centralized lubricating installation to control the flow of lubricant from the tubing system of such an installation to a bearing to be lubricated, said valve including a fitting provided with a recess, one end of which recess is formed as a valve seat and the other end of which recess is provided with a retainer cup to close the same, said recess receiving a metallic valve and a coil spring reacting between said valve and said retainer, said spring tending to press said valve against said seat, said valve when unseated by pump pressure forming a minute annular crevice serving as the sole high restriction, in respect to said recess, which restriction has a predominating effect upon the flow of oil and a tremendously higher resistance than the resistance of the tubing system and the bearing, the rating of each fitting being determined by the strength of said spring.

14. A drip plug unit comprising a cartridge having a valve seat therein, a ball valve fitting snugly within the cartridge, a spring urging said valve against its seat, and a strainer unit in the inlet end of the cartridge.

15. A drip plug element comprising a cartridge having a seating disk fixed transversely across the bore thereof, said disk having a minute highly resistant flow controlling aperture therethrough, a disk valve within said cartridge, a spring urging said valve against said seat, a strainer plug in the inlet end of said cartridge and means retaining said strainer plug in position.

16. A drip plug element comprising a cartridge having a valve seating disk provided with an upstanding flange friction fitted into the bore of the cartridge, a disk valve within said bore, a spring urging said valve against said seat and a strainer plug having a metal screen holding cup at the inner end thereof bottoming against the rim of said seating disk.

17. A drip plug element comprising a cartridge having a pressed metal plug friction fitted thereinto and affording a passageway of minute accurately predetermined cross section, a strainer plug within said cartridge and at the inlet end thereof, said cartridge having an internal shoulder near the outer end of said strainer plug, a liner sleeve protruding from said cartridge and having an enlargement resting against said shoulder, the end of said cartridge being swaged inward at said head to retain the liner sleeve in position.

18. A drip plug unit comprising a cartridge having a pressed-metal plug friction-fitted thereinto and affording a passageway of minute accurately predetermined cross section, said plug countersunk at its inlet end, a strainer plug within said cartridge bottoming against the rim of said countersunk portion, said cartridge having an internal shoulder near the outer end of said strainer plug, a liner sleeve protruding from said cartridge and having an enlargement resting against said shoulder, a coupling sleeve against the end of said cartridge and encircling said liner sleeve and a threaded bushing to encircle a lubricant supply pipe and exerting a pressure on said coupling sleeve to force the end of said pipe against said liner sleeve thereby to effect a lubricant-tight connection.

19. A metering valve unit for use in a centralized lubricating installation having a distributing piping system leading to bearings, said unit being adapted to control the flow of lubricant from said piping system to one of said bearings and said metering valve unit having a metal body with an inlet connection and an outlet connection and with a central passage, a reciprocable metal valve element closely fitting and substantially blocking said passage, a coil spring in said body reacting at one end against said metal element and causing it to altogether close said passage, said passage at one end having a seat for said valve element and said passage being closed by said valve element when said valve element is pressed against the said seat but permitting it to open said passage when a lubricant pressure exceeding a predetermined minimum is applied to said piping system by said pump, said opening being formed between said valve element and said seat and taking the form of a minute annular crevice which forms substantially the sole restriction between the inlet connection and the outlet connection, said unit when flow is permitted through said metering valve unit from said inlet connection to said outlet connection affording a predominating obstruction to the flow of lubricant as compared to that afforded in the piping system or in the bearing, whereby said metering valve unit will substantially determine the flow to the bearing to which it is connected.

20. A metering fitting for use in a centralized lubricating system for predominantly controlling feed of lubricant from distributing piping, a bearing including restriction means, said restriction means including a check valve having a seating spring, said fitting having a casing for said valve with an annular seat for said valve and said spring only permitting said valve to crack off its seat to form a narrow annular crevice constituting substantially the sole restriction of the fitting and providing a restriction of much higher resistance than the resistance of the system and the bearing, said spring determining the opening pressure to which said valve will crack off its seat, said fitting having an exposed designation indicating the quantity of liquid which it will emit, whereby the fitting may be readily selected and installed in accordance with the charge required at a selected place to feed its correct proportion of liquid under pressure from a common source, said valve upon application of lubricant pressure sufficient to overcome the seating pressure of said spring affording a minute high resistance crevice for the flow of lubricant.

GEORGE BIJUR.
*Executor of the Estate of Joseph Bijur, Deceased.*